United States Patent [19]

Fergason et al.

[11] Patent Number: 5,159,475

[45] Date of Patent: Oct. 27, 1992

[54] HIGH SPEED OPTICAL PROTECTION USING SMECTIC LIQUID CRYSTAL

[75] Inventors: James L. Fergason, Atherton; Ning S. C. Fan, Cupertino; Jesse D. Buck, Redwood City, all of Calif.

[73] Assignee: Optical Shields, Inc., Menlo Park, Calif.

[21] Appl. No.: 759,054

[22] Filed: Sep. 5, 1991

Related U.S. Application Data

[63] Continuation of Ser. No. 356,974, May 25, 1989, abandoned.

[51] Int. Cl.$^5$ .............................................. G02F 1/13
[52] U.S. Cl. ...................................... 359/38; 359/41; 359/100; 359/94; 359/58
[58] Field of Search ................ 350/350 S, 350 R; 252/299.63, 299.61, 299.01; 359/38, 58, 41, 100, 94

[56] References Cited

U.S. PATENT DOCUMENTS

| | | | |
|---|---|---|---|
| 3,851,318 | 11/1974 | Taylor | 340/173 LS |
| 4,037,929 | 7/1977 | Bricot et al. | 350/160 |
| 4,279,474 | 7/1981 | Belgorod | 350/331 |
| 4,373,218 | 2/1983 | Schachar | 3/13 |
| 4,462,661 | 7/1984 | Witt | 350/331 |
| 4,601,545 | 7/1986 | Kern | 350/347 |
| 4,679,911 | 7/1987 | Jacobs et al. | 350/347 |
| 4,762,399 | 8/1988 | Wu | 359/41 |
| 4,765,719 | 8/1988 | Fergason | 350/350 S |
| 4,834,906 | 5/1989 | Coates et al. | 252/299.63 |
| 4,838,663 | 6/1989 | Lagerwall et al. | 359/100 |
| 4,883,344 | 11/1989 | Okada et al. | 350/350 S |
| 4,886,620 | 12/1989 | Hopf et al. | 350/350 S |
| 4,888,126 | 12/1989 | Mullen et al. | 350/350 R |
| 4,893,907 | 1/1990 | Mallinson | 350/350 S |
| 4,913,530 | 4/1990 | Ichimura et al. | 350/350 R |
| 4,927,244 | 5/1990 | Bahr et al. | 359/93 |
| 4,933,167 | 1/1991 | Fergason | 359/38 |
| 5,073,010 | 12/1991 | Johnson et al. | 359/72 |

FOREIGN PATENT DOCUMENTS

| | | |
|---|---|---|
| 2530039 | 6/1982 | France. |
| 55-82923 | 6/1980 | Japan. |
| 8805926 | 8/1988 | PCT Int'l Appl. . |
| 9014611 | 11/1990 | PCT Int'l Appl. . |
| 2011640 | 12/1978 | United Kingdom. |
| 2169417 | 12/1985 | United Kingdom. |

*Primary Examiner*—Andrew J. James
*Assistant Examiner*—Daniel N. Russell
*Attorney, Agent, or Firm*—Renner, Otto, Boisselle & Sklar

[57] ABSTRACT

An apparatus for responding to incident electromagnetic radiation includes a first medium having a surface and through which incident electromagnetic radiation may be transmitted, a second such medium having a surface, the surfaces being generally parallel, and smectic liquid crystal between said surfaces and aligned generally in parallel in layers that extend generally parallel to each other and perpendicularly to such surfaces (bookshelf alignment), the liquid crystal material being operative to undergo self-focusing in response to a characteristic of incident electromagnetic radiation exceeding a value and being cooperative with at least one of such media thereby automatically to limit the energy or energy density of electromagnetic radiation exiting the apparatus.

50 Claims, 7 Drawing Sheets

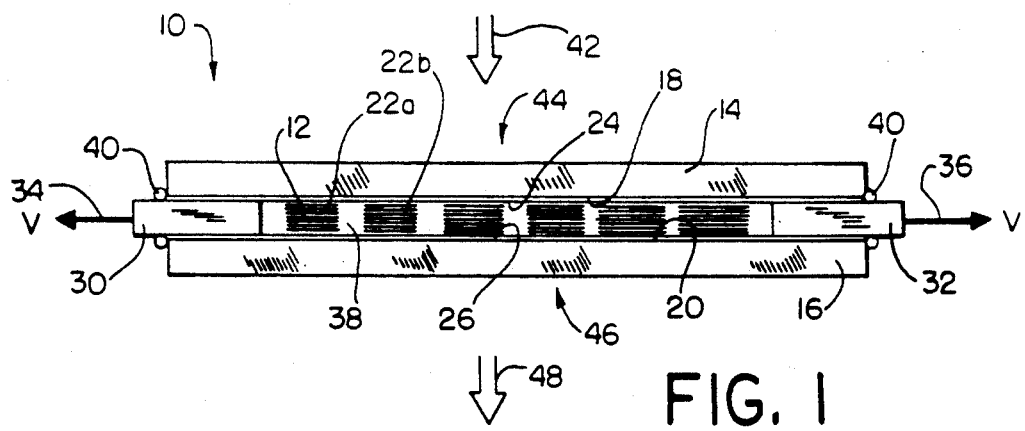
FIG. 1
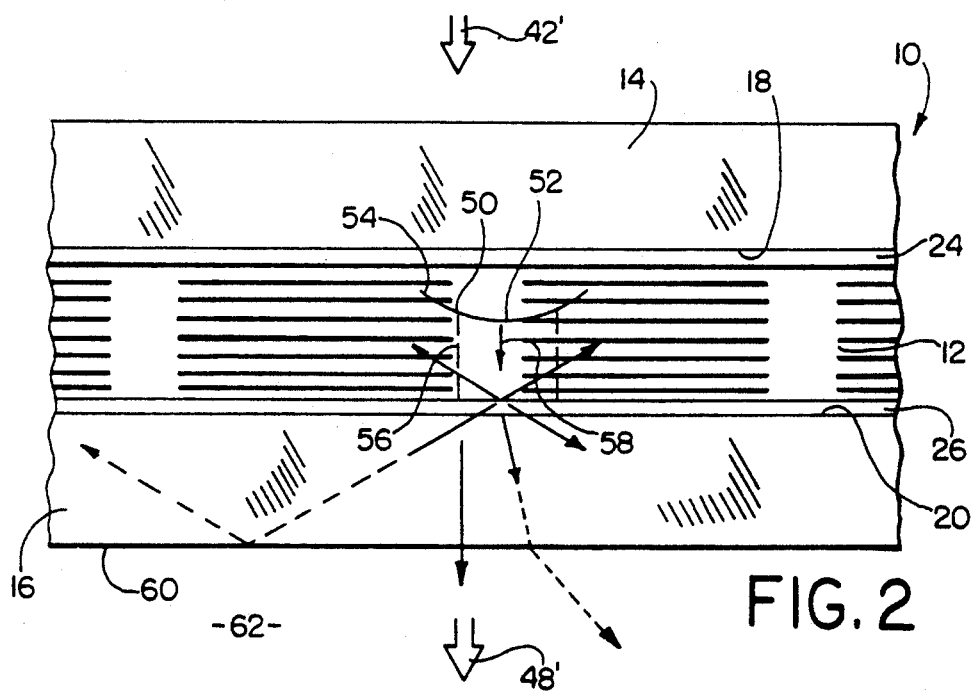
FIG. 2
| NEMATIC | CHOLESTERIC (TWISTED NEMATIC) | SMECTIC A |
|---|---|---|
|  | 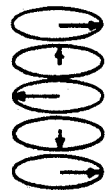 | 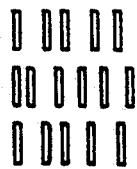 |
| MOLECULES ARE ALIGNED, BUT RANDOMLY DISTRIBUTED IN SPACE. | ARROWS SHOW THE LONG AXIS DIRECTION WITHIN PARALLEL LAYERS. | MOLECULES ARE ALIGNED, AND ALSO ORGANIZED INTO LAYERS. |
| FIG. 3A | FIG. 3B | FIG. 3C |

3.9 MICROJOULES IN
3.9 MICROJOULES OUT 6.7 MICROJOULES IN
5.6 MICROJOULES OUT

16 MICROJOULES IN
8.3 MICROJOULES OUT 2.2 MICROJOULES IN
8.2 MICROJOULES OUT

27 MICROJOULES IN
7.5 MICROJOULES OUT

132 MICROJOULES IN
3.4 MICROJOULES OUT

RUB DIRECTION ON
PERPENDICULAR CELL

RUB DIRECTION ON
PARALLEL CELL

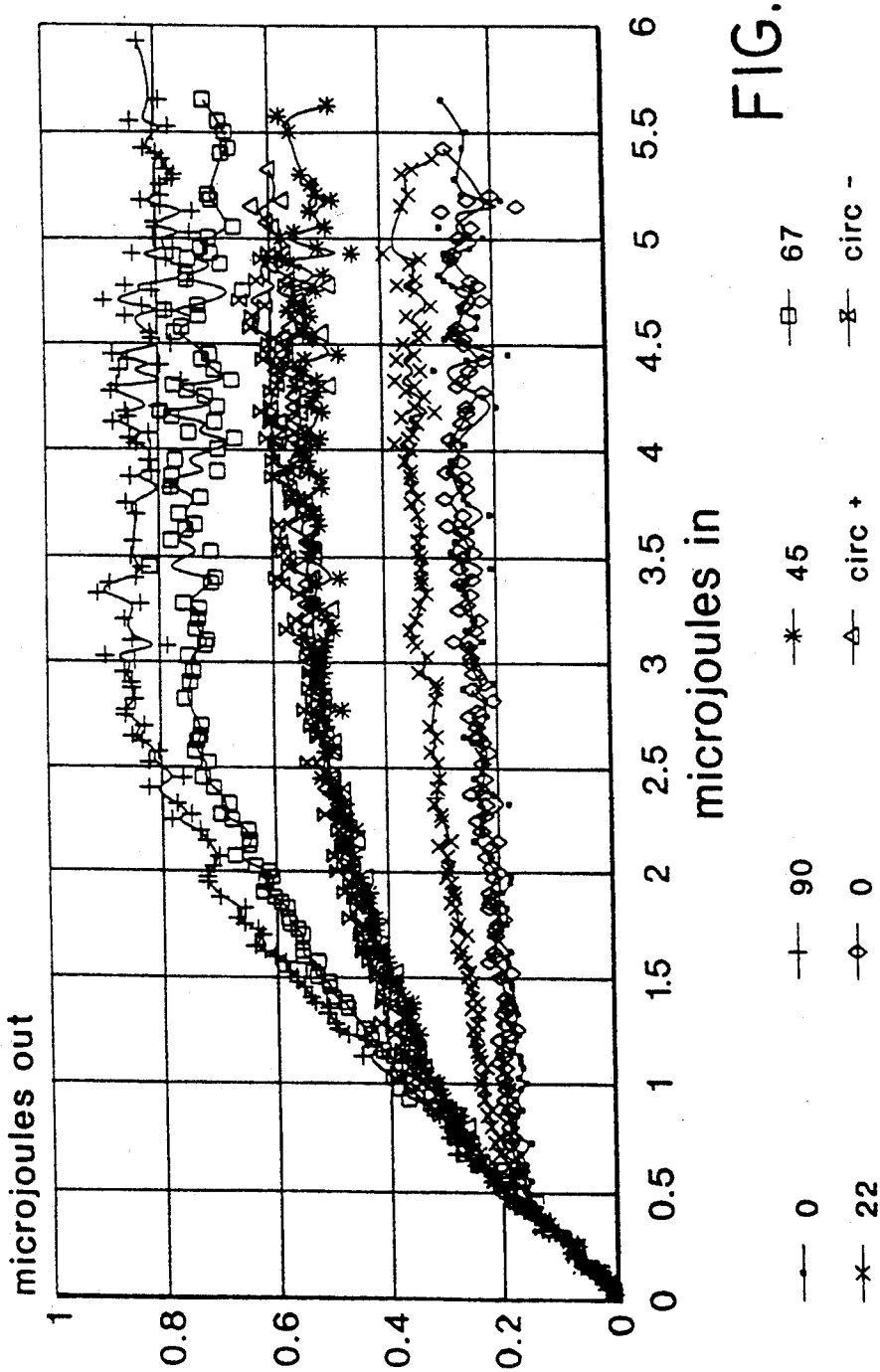

HIGH SPEED OPTICAL PROTECTION USING SMECTIC LIQUID CRYSTAL

This is a continuation of copending application Ser. No. 07/356,974 filed on May 25, 1991 now abandoned.

TECHNICAL FIELD

This invention relates generally, as indicated, to liquid crystal devices, and, more particularly, to an optical limiter using smectic liquid crystal.

BACKGROUND

Liquid crystal materials primarily are categorized as three types. These include smectic, nematic and cholesteric liquid crystal materials. Such materials have respective characteristic structural and operational properties. For example, some types of nematic liquid crystal material are anisotropic and birefringent. Moreover, some liquid crystal materials may have characteristics of one phase, say a smectic phase, at one temperature and a different phase, say a nematic phase, at a different temperature.

Moreover, there are several types of smectic liquid crystal materials. Two of these include those designated smectic A and those designated smectic C. Each type of smectic liquid crystal material has particular characteristics, which are known. A common characteristic of smectic liquid crystal material is the tendency of the liquid crystal material normally or usually to align generally in parallel and in layers. In contrast, nematic liquid crystal normally tends to align in parallel but without positional alignment in layers, and cholesteric and twisted nematic liquid crystal normally aligns in a twisted or helical fashion, all of which is well known. Note that as used herein alignment of liquid crystal or liquid crystal structure refers to the alignment characteristic of the liquid crystal director.

One exemplary use of the birefringent characteristics of nematic liquid crystal material in a containment medium in the past has been to effect controlled scattering of incident light. For instance, if the ordinary index of refraction and the extraordinary index of refraction of the liquid crystal are, respectively, the same as and different from the index of refraction of the medium, when the extraordinary index is encountered light will refract at the interface of the liquid crystal and medium and will scatter and when the ordinary index is encountered light will be transmitted without substantial refraction or scattering. Moreover, pleochroic dye has been used together with nematic liquid crystal material that is responsive to a prescribed input to dye, to filter or to absorb light as a function, for example, of structural characteristics of the liquid crystal material and dye.

Smectic liquid crystals are characterized by a structure which is generally linear and layered. Smectic liquid crystal materials have not been used until recently, and then in the limited construction of display devices and some memory devices. Smectic phase generally occurs at a temperature which is lower than the corresponding nematic or cholesteric phases that often are associated with optical applications. Earlier smectic liquid crystal materials were not used because the nature of the smectic phase makes it more difficult to align or to arrange the liquid crystal structure than the higher temperature phases.

The Kerr effect, more precisely the electrooptical Kerr effect, is a birefringence that is induced electrically. The basis of the Kerr effect theory is documented in various texts. Examples are *Light* by R. W. Ditchburn, Academic Press (London, 1976) and *Optics & Lasers* by Matt Young, Springer-Verlag (New York, 1984). The entire disclosures of such books are hereby incorporated by reference.

Light is a term by which reference is made to a form of electromagnetic radiation generally in a particular wavelength band or frequency range. In the context of the present invention light is used to refer to such electromagnetic radiation in the visible, ultra-violet and infrared ranges. Generally, the reference to light, electromagnetic energy, or electromagnetic radiation herein means that electromagnetic energy or radiation that will operate in accordance with the principles of the present invention.

Self-focusing is a term used to indicate that a material itself has the ability to cause a focusing type of action with respect to electromagnetic energy as a function of a characteristic of the electromagnetic energy As is described further below, the invention is operative to self-focus light as a function of a characteristic of the light.

BRIEF SUMMARY

Fundamentally, the present invention is intended to prevent the transmission of incident electromagnetic radiation as a function of a characteristic of such electromagnetic radiation. Preventing transmission may mean either preventing the direct transmission of incident light, e.g., by scattering, defocusing, reflecting, and/or absorbing, and so on, as is described further below. Optical density or light density refer to intensity of light per unit area. For example, a beam of light having one cross sectional area may be spread to have a larger cross sectional area so as to include the same total quanta of light but to have a smaller intensity per unit area.

It is well known that light propagating in a particular direction P, for example, can be represented by two quadrature components identified as electric vector E and magnetic vector B, which extend at right angles to each other and at right angles to the propagation direction P. It is believed that the present invention as is described in greater detail below is operative to perform optical limiting in response to energy or peak power represented by the electric vector E of the incident light.

In a preferred embodiment and best mode of the invention such electromagnetic radiation is light, and, more specifically, coherent light, and such characteristic is the particular degree of coherence, intensity, magnitude of electric vector, input energy, peak power or a combination of two or more thereof; and the extent of optical limiting is a function of one of the value of such characteristic(s).

The mentioned preventing of direct transmission of incident light may be, for example, the focusing of light to a point beyond the Rayleigh limit and/or the focusing and then appreciably spreading the light to achieve a relatively low light density at the area being protected by the invention.

Briefly, according to the invention an apparatus for responding to incident electromagnetic radiation includes a first medium through which incident electromagnetic radiation may be transmitted, and liquid crystal means positioned with respect to said first medium for responding to a characteristic of the incident electromagnetic radiation to cooperate with such first medium to effect refraction of such electromagnetic radiation at an interface of said first medium and said liquid crystal means. The medium may be a glass, plastic or like surface, and, more preferably, is a sheet of glass. Even more preferably, there are a pair of such sheets with the liquid crystal material sandwiched therebetween.

According to one aspect of the invention, an optical limiter includes smectic liquid crystal between a bounding media, the liquid crystal being aligned in layers which are oriented generally perpendicularly with respect to the media. Preferably such media comprise respective surfaces.

According to another aspect of the invention, an optical limiter includes smectic liquid crystal material in layered alignment between a pair of surfaces, an input side for receiving incident light, and an output side for permitting light transmitted through the limiter to exit therefrom, the liquid crystal being operative in response to a light input exceeding a prescribed value automatically to limit the exiting of light from the output side.

According to a further aspect of the invention, an optical apparatus includes means for receiving incident light, means for delivering output light as an output of the apparatus, optical means for directing incident light to the means for delivering output light to provide a light output from the apparatus, and an optical limiter between the means for receiving and the means for delivering operative automatically to limit the amount of output light as a function of the value of a characteristic of such incident light.

These and other objects, aspects, features, embodiments and advantages will become more apparent from the following detailed description of the invention. It will be appreciated that although several detailed examples of the invention are described herein, the scope of the invention is to be determined from the scope of the claims and the equivalents thereof.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a schematic illustration of an optical limiter according to the present invention depicting operation to transmit light without limiting such light;

FIG. 2 is a schematic fragmentary illustration of optical limiter of FIG. 1 depicting operation to effect optical limiting;

FIGS. 3A, 3B, and 3C are schematic illustrations depicting normal alignment characteristics of nematic, cholesteric or twisted nematic, and smectic liquid crystal materials;

FIG. 13 is a graph showing the power limiting dependency of the optical limiter according to the invention as a function of the direction of electric vector relative to the direction of the long axis of the liquid crystal molecules;

DETAILED DESCRIPTION

The Optical Limiter 10

Figure 4:
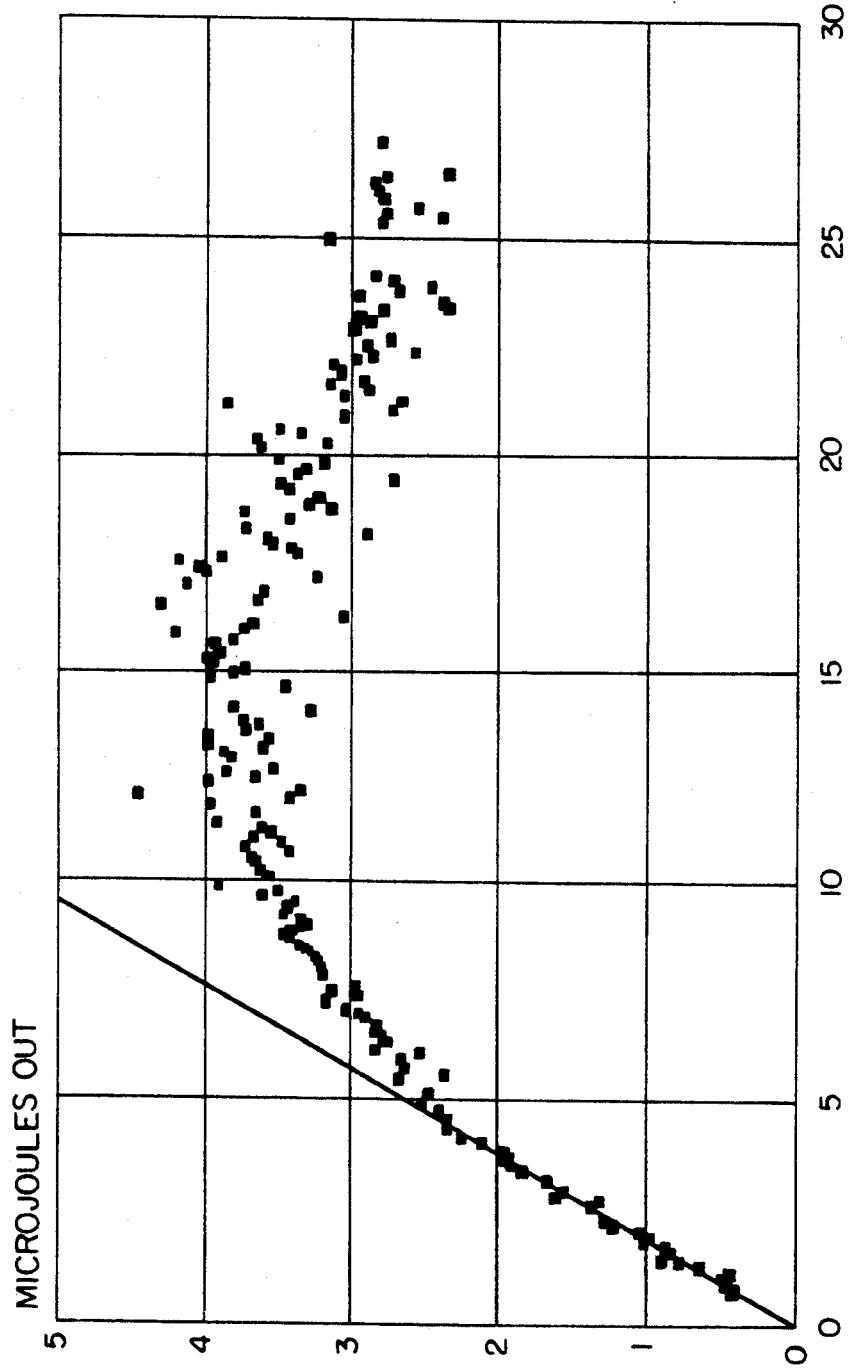
FIG. 4 is a graphical illustration demonstrating the optical power limiting characteristics of an optical limiter in accordance with the present invention, the orthogonal axes being scaled according to microjoules of energy input to the optical limiter and microjoules of energy output by the optical limiter.

Referring, now, in detail to the drawings, wherein like reference numerals refer to like parts in the several figures, and initially to FIG. 1, a liquid crystal optical limiter in accordance with the present invention is designated 10. The optical limiter 10 appears as a liquid crystal cell that includes liquid crystal material 12 sandwiched between a pair of media 14, 16, the media preferably being a material that provides surfaces 18, 20 or means to define surfaces, such as glass plates, plastic plates, etc.

The liquid crystal material 12 is smectic liquid crystal material, is operationally smectic, or is a material that exhibits the characteristics described herein. Operationally smectic liquid crystal is liquid crystal material which exhibits properties, such as those of alignment, of smectic liquid crystal material. In particular, the liquid crystal material 12, aligns in layers which layers align generally in parallel with each other and perpendicularly with respect to the surfaces 18, 20. Moreover, the liquid crystal in the respective layers align generally in parallel with the other liquid crystal material in the respective layer. Smectic A liquid crystal material is an example of the preferred type of liquid crystal material that exhibits the above characteristics and other operational characteristics described herein.

The liquid crystal material 12 may have positive dielectric anisotropy or negative dielectric anisotropy. The liquid crystal material preferably is a material that operates as smectic liquid crystal material and, therefore, may be categorized as operationally smectic. Although other materials may be used, exemplary smectic or operationally smectic liquid crystal materials that may be used in accordance with the present invention include the following four materials, each of which is comprised of the stated proportional recipe for making same. Abbreviations are used for space minimizing, as follows:

K-24 is 4-Cyano-4'-n-octylbiphenyl represented

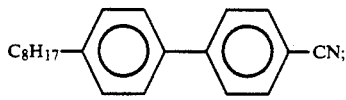

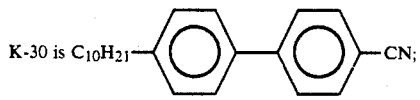

K-36 is 4-Cyano-4'-n-Dodecanylbiphenyl represented

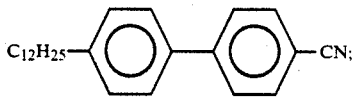

The foregoing three materials are sold by British Drug House (BDH).

2LI-1844 is nematic liquid crystal sold by E. Merck. Exemplary operationally smectic materials useful in the invention are identified below. Each of such materials 1, 2, or 4 may be used according to the invention. Material 1 is a combination of the following ingredients in the indicated percentages by weight:

| K-24 | 13.9% |
| K-30 | 26.6% |
| K-36 | 29.5% |
| 2LI-1844 | 30.0% |

Material 2 is a combination of the following ingredients in the indicated percentages by weight:

| K-24 | 19.2% |
| K-30 | 38.4% |
| K-36 | 42.4% |

Material 3 is a combination of the following ingredients in the indicated percentages by weight:

| K-24 | 16.6% |
| K-30 | 33.2% |
| K-36 | 36.7% |
| 2LI-1844 | 13.4% |

Material 4 is a combination of the following ingredients in the indicated percentages by weight:

| K-24 | 17.1% |
| K-30 | 34.2% |
| K-36 | 37.6% |
| 2LI-1844 | 11.0% |

From the illustration of FIG. 1, the alignment characteristics of the liquid crystal 12 are seen. In particular, the liquid crystal or the liquid crystal structure is aligned in a plurality of layers 22a, 22b, etc. The layers 22a, 22b, etc. are aligned in parallel with each other and they extend perpendicularly with respect to the surfaces 18, 20. Moreover, the structure or alignment of the liquid crystal in a given layer is parallel, e.g., the directors of the liquid crystal in a given layer are generally parallel to each other and perpendicular to the directional extent of the layer. The alignment of the liquid crystal or of the directors thereof is parallel to the surfaces 18, 20.

Although it is known that smectic liquid crystal normally tends to align in layers, in order to facilitate obtaining alignment the layers 22a, 22b in perpendicular relation to the surfaces 18, 20, the surfaces preferably include a liquid crystal alignment layer. Such an alignment layer is conventional, for example, in twisted nematic liquid crystal cells. One example is a layer of polyvinyl alcohol 24, 26, which is applied to each of the surfaces 18, 20; and each of those layers 24, 26 is rubbed in a linear direction using a conventional fabric, buffer, etc., such as cotton, a polyaramid fiber, etc. An alternative alignment layer material may be a polyimid, which also is rubbed linearly as described. The liquid crystal tends to align generally in parallel with the rub direction.

In the liquid crystal cell of the optical limiter 10, the plates 14, 16 are assembled such that the linear directions of rubbing of each of the alignment layers 24, 26 are parallel to each other. As is illustrated in the drawings, the preferred alignment configuration of liquid crystal material in the optical limiter takes on the appearance of a bookshelf, i.e., plural parallel shelves (representing the liquid crystal layers 22a, 22b, etc.) with plural books (representing the liquid crystal molecules, for example) on each shelf.

The plates 14, 16 may be of any shape. For example, such plates may be rectangular in plan view. Preferably the plates 14, 16 are flat or planar, or at least the surfaces thereof are flat or planar. Moreover, for uniformity, the thickness of the plates preferably is uniform to avoid unintentionally distorting light. It will be appreciated that the plates or the surfaces thereof may be other than flat, e.g., curved, and/or may be of non-uniform thickness to effect an intended focusing or other function. Moreover, although the plates 14, 16 may be of the same material, they may be of different materials; for example, they may have different indices of refraction to achieve a prescribed type of operation.

As is described further below, the liquid crystal cell forming the optical limiter 10 of FIG. 1 may include electrodes 30, 32 for applying electric field to the liquid crystal material tending to align the liquid crystal material in a preferred direction parallel to the surfaces 18, 20. The electrodes may be conventional electrode material used in liquid crystal displays and the like, such as, for example, respective layers of indium tin oxide (sometimes referred to as ITO) material. Application of a voltage between the electrodes 30, 32, e.g., using leads 34, 36 which are coupled to a conventional circuit and/or power supply (not shown), applies an electric field through the liquid crystal material 12 in a direction generally parallel to the surfaces 18, 20. If the liquid crystal material 12 has positive dielectric anisotropy, it will tend to align in parallel with such a field; and if the liquid crystal material has negative dielectric anisotropy, it will tend to align generally perpendicularly to the direction of the field; but in either case the liquid crystal alignment will be that of the bookshelf configuration illustrated and described herein.

To seal the liquid crystal material in the interior volume 38 of the liquid crystal cell forming the optical limiter, epoxy 40 or other material is applied in the areas of the electrodes 30, 32 and the plates 14, 16. Also at areas where there is no electrode between the plates 14, 16 a conventional plug or spacer material, such as a glass spacer, may be positioned and sealed in place by epoxy. Materials other than epoxy may be used for such sealing.

Operation Of The Optical Limiter 10

As is seen in FIG. 1, incident light 42, such as that from a laser (laser light), is impinging on the input side 44 of the optical limiter 10. Such incident light 42 has a relatively low electric vector, energy, or peak power magnitude that is below the threshold level required for optical limiting operation of the optical limiter 10. Therefore, such light is transmitted through to the output side 46 of the optical limiter 10 and is provided as a light output 48 substantially without any attenuation or limiting. Preferably if such incident light 42 has image characteristics, those characteristics are retained in the output light 48, whereby the optical limiter 10 essentially appears transparent or nearly transparent.

However, as is seen in FIG. 2, incident light 42' is impinging on the optical limiter 10. Such incident light 42' has a relatively large electric vector, energy, or peak power magnitude that is above the threshold level required for optical limiting operation of the optical limiter 10. Therefore, the optical limiter 10 operates to limit the power of the light output 48'. It is believed that the following occurs in the optical limiter to effect such limiting of power of the light output 48'.

In response to the incident light, the liquid crystal material 12 performs self-focusing so as to conduct the light somewhat as a fiber optic member might conduct light. In FIG. 2 the wavefront 50 of the light passing through the liquid crystal material 12 is seen. It appears that the index of refraction of the liquid crystal material 12 near the center 52 of that wavefront increases some amount from the index of refraction exhibited prior to impingement of such light thereon. It also appears that the index of refraction of the liquid crystal material more toward the perimeter or outer boundaries of such wavefront, e.g., represented at 54, increases some amount from the index of refraction exhibited prior to impingement of such light thereon, but such increase is less than occurs near the center 52. The index of refraction of the liquid crystal material 12 across the wavefront 50 appears to vary continuously, although perhaps non-linearly Such variation in index of refraction of the liquid crystal material causes the mentioned self-focusing.

Although the wavefront 50 may begin travel through the liquid crystal material 12 as a planar wavefront, depending on the degree of coherence of the incident light 42', it is believed that such wavefront tends to curve in the manner illustrated after some amount of travel through the liquid crystal material. It is believed that such curving is due to the changes that occur in index of refraction, as was just described.

Moreover, the self-focusing tends to increase or to continue until the Rayleigh limit is reached, whereupon continued conducting of light through the liquid crystal material occurs in a fashion similar to conduction through a fiber optic member, as is depicted at 56 in FIG. 2. Thus, such light is trapped between the side boundaries of the effective fiber optic member 56, as is depicted at 58 according to principles of total internal reflection, etc., as are well known in the field of propagation of light through a fiber optic member. Such light 58 propagates toward the surface 20 at which the effective fiber optic member 56 terminates. (For purposes of this description it is understood that the aligning layers 24, 26 are the same as the surfaces 18, 20.)

Where the light 58 exits the effective fiber optic member 56, some of such light tends to refract at the interface with the surface 20 as the light enters the plate 16; some of such light tends to undergo total internal reflection at the interface with such surface 20; and some of such light tends to be transmitted, substantially without refraction, through the interface with such surface into the material forming the plate 16, depending, for example, on the angle with which the light is incident on the interface between the effective fiber optic member 56 and the surface 20. Moreover, some of the light entering the plate 16 may undergo total internal reflection, refraction, or transmission at the interface of the output surface 60 of the plate 20 with the medium 62 beyond such surface, such as air, etc. The various possibilities of light travel just described are illustrated in FIG. 2 by respective arrows, as will be evident.

Further, as to light that is reflected back into the liquid crystal material 12 by either of the surfaces 20, 60, and as to the light that may escape through a side wall of the effective fiber optic member 56, such light may continue to travel through the liquid crystal material 12, to be reflected and/or totally internally reflected at another interface existing in the liquid crystal cell forming the optical limiter, etc., thus reducing the total power, density, etc., of the light 48' actually transmitted as output light. Some of such light also may be reflected or back scattered toward the source of the incident light 41'.

In the event the liquid crystal material 12 is not aligned, as was described above, an electric field may be applied to the liquid crystal material using the electrodes 30, 32. Such electric field will cause the illustrated and described bookshelf alignment to be reconstituted.

Liquid Crystal Alignment Possibilities

Referring to FIGS. 3A, 3B and 3C, the usual alignment characteristics of liquid crystal materials are illustrated. In FIG. 3A it is seen that nematic liquid crystal material usually aligns directionally in parallel alignment; however, there is no positional alignment, e.g., of the type that is exhibited by smectic liquid crystal material. In FIG. 3B the helical or twisted alignment that is assumed by cholesteric liquid crystal material and twisted nematic liquid crystal material is illustrated. Further, in FIG. 3C is illustrated the alignment of smectic liquid crystal material, namely, the liquid crystal structure is parallel and there is positional alignment whereby the liquid crystal molecules are organized in respective layers (e.g., as layers 22a, 22b, etc. described above with respect to FIG. 1).

It is believed that smectic liquid crystal material having the illustrated and described bookshelf type alignment is required for operation of the present invention in the manner described herein. However, it is possible that other types of liquid crystal material aligned in the same or in a different way may operate similarly to provide the optical limiting function described herein; and the invention is intended to cover those equivalent possibilities.

Briefly referring to FIG. 4, there is illustrated a graph depicting exemplary test data for a liquid crystal cell optical limiter 10 described above. Along the abscissa (bottom or "x" axis) is represented value of energy or power in microjoules for the input or incident light 42, 42′; and along the ordinate (side or "y" axis) is represented value of energy or power in microjoules for the output light 48, 48′. It will be seen that the power of the output light is a linear function of the power of the input light until the input light reaches a power level of about five or six microjoules. Beyond that power level, the optical limiter 10 tends to limit the output power level to from about two and one half to four microjoules as the input power level increases to about twenty-seven microjoules.

In FIGS. 5A through 5F are illustrated graphs for comparing the optical response of the liquid crystal cell optical limiter 10 for different power inputs. The graphs of FIGS. 5A through 5F have the same scale along the abscissa, i.e., from zero to sixteen nanoseconds, depicting the length of time of a pulse of incident light 42, 42′. The scale along the ordinate for each of the graphs of FIGS. 5A through 5F also is the same, i.e., from zero to one; but such scale is normalized in that it represents noralized data of from zero to the maximum of the particular input power of the incident light 42, 42′. Therefore, in the graph 70 of FIG. 5A, the peak of the input light curve 70′ represents 3.9 microjoules; in the graph 78 of FIG. 5E, the peak of the input light curve 78′ represents 27 microjoules; and so on, as will be evident upon inspecting such drawing figures.

Reviewing the graphs 70-80, it will be seen that for a relatively low input power of 3.9 microjoules represented by curve 70′, the output power also will be about 3.9 microjoules, as is represented by curve 70″. For a relatively low, but slightly larger input power of 6.7 microjoules represented by curve 72′, the output power also will be slightly limited to about 5.6 microjoules, as is represented by curve 72″. For a still larger input power of 16 microjoules represented by curve 74′, the output power will be limited to about half, i.e. about 8.3 microjoules, as is represented by curve 74″; such limiting occurs in a relatively short time of about 6 nanoseconds.

Figure 5A:
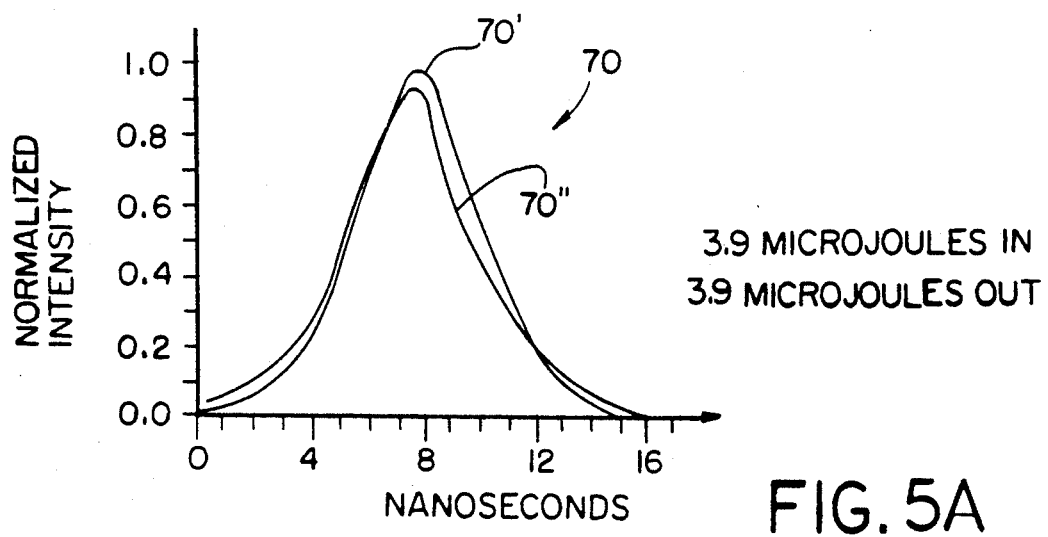
FIGS. 5A through 5F are, respectively, comparative graphs depicting a comparison of input and output electromagnetic energy pulses shown as normalized energy versus time with respect to time for a plurality of respective input energy pulses ranging from about 3.9 microjoules to about 132 microjoules.
Figure 5B:
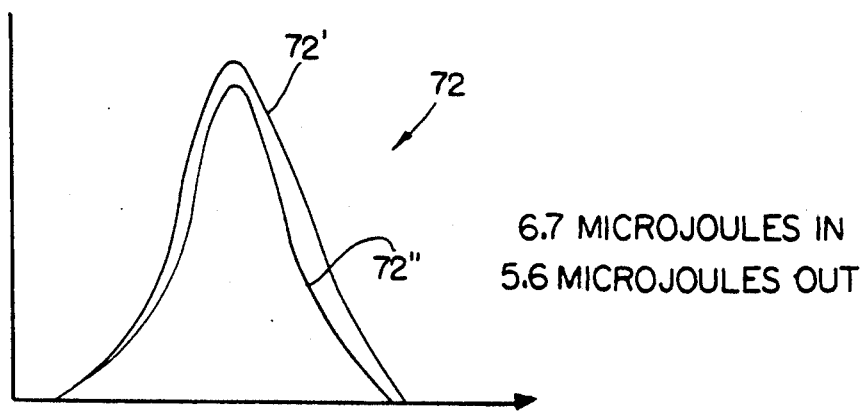
Figure 5C:
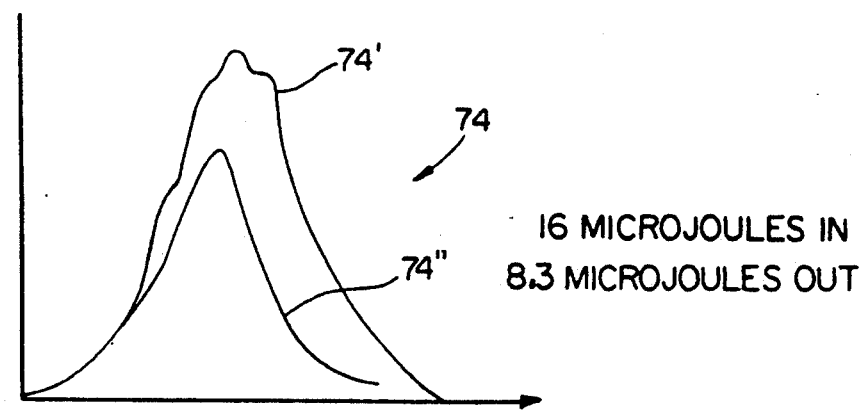
Figure 5D:
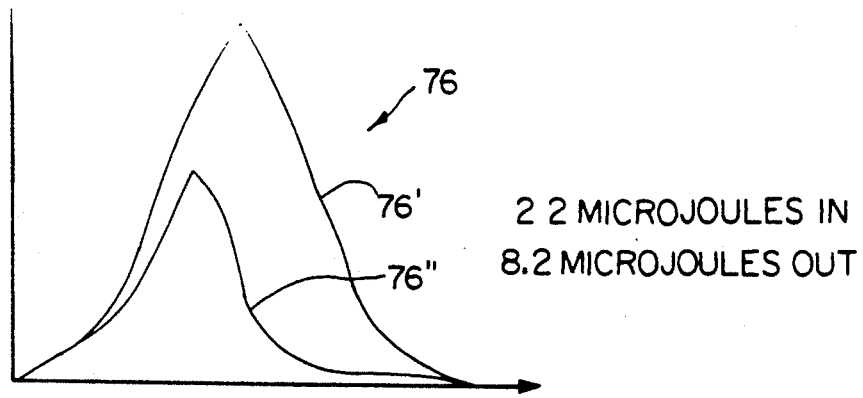
Figure 5E:
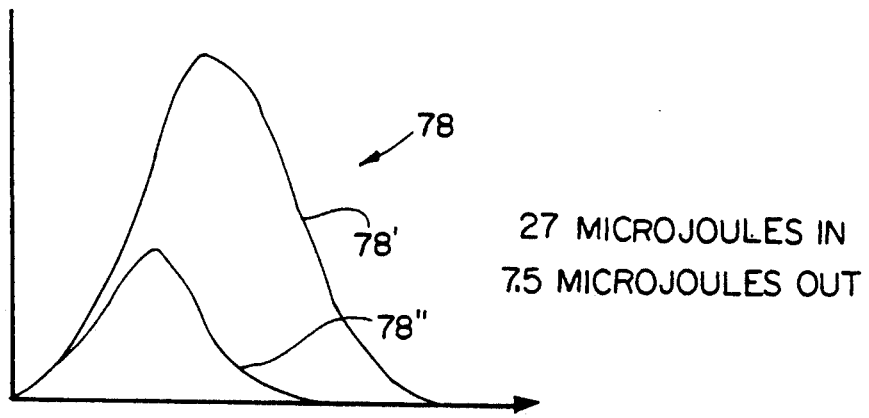

Optical power limiting increases as power of the incident light increases, as is seen in FIGS. 5D and 5E, in which input power is, respectively, 22 and 27 microjoules and output power is, respectively, 8.2 and 7.5 microjoules. From the graphs of FIGS. 5D and 5E it will be seen that the larger the power of the incident light, the smaller will be the power of the output light and the faster the maximum limit of the output light power is reached, e.g., respectively, in about 4 nanoseconds and in about 3 nanoseconds.

Figure 5F:
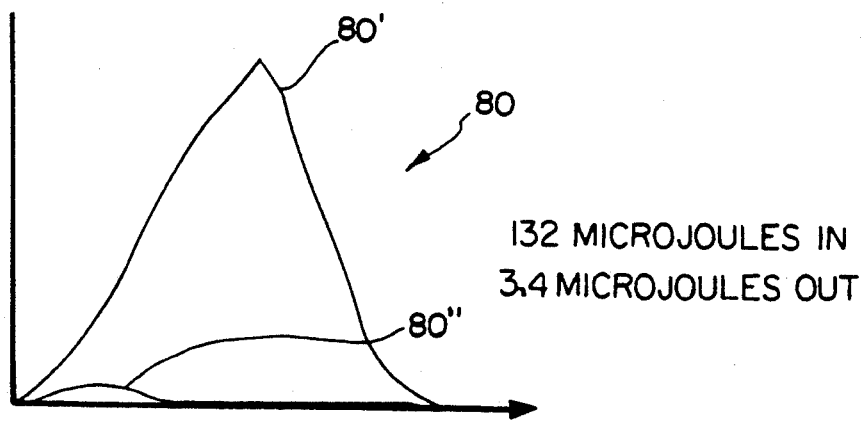

Further, as is seen in FIG. 5F, when the power of the incident light is 132 microjoules, the power of the output light is limited to 3.4 microjoules, and such limiting occurs in from about 1 to 2 nanosecond(s). In the above examples the liquid crystal automatically tends to resume the substantially transmissive characteristic upon removal of the electromagnetic energy or radiation as long as the optical limiting characteristic of the optical limiter 10 has not exceeded a prescribed amount. An example of such prescribed amount is a ratio of about 20 to 1. In the event the large power input causes some localized heating of the liquid crystal material, operation as described still tends to occur because of the speed with which optical limiting happens. If it becomes necessary to reset the liquid crystal to the bookshelf alignment because such heating may have changed such alignment, application of electric field as described above may be employed.

Figure 7:
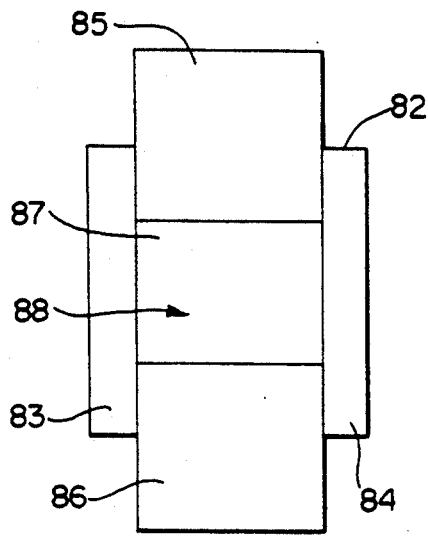
FIG. 7 is a top view of the optical limiter looking generally in the direction of the arrows 7—7 of FIG. 6, the liquid crystal aligning material and rubbing direction being omitted.
Figure 8:
FIG. 8 is a side view of the optical limiter looking generally in the direction of the arrows 8—8 of FIG. 6.
Figure 9:
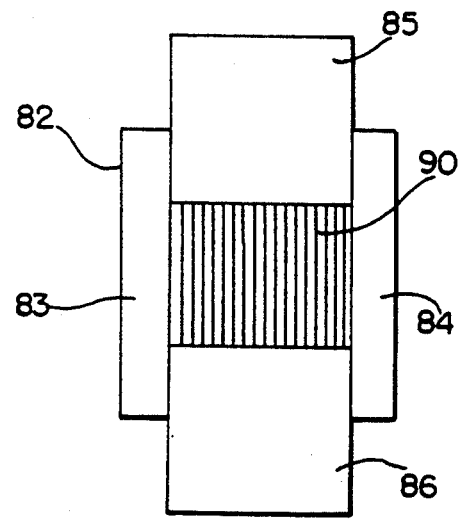
FIG. 9 is a top view of the liquid crystal optical limiter similar to FIG. 7 but showing a liquid crystal aligning material and a rubbing direction that is generally in parallel with the direction that an electric field would be applied.

Turning to FIGS. 7 through 9, an examplary liquid crystal cell 80 embodying the optical limiter 10 of the invention is illustrated. Such cell 80 includes a glass plates 81, 82, glass spacers 83, 84, electrodes 85, 86, and liquid crystal material 87 in the interior volume 88. Epoxy sealant preferably is used to seal the edges of the cell to prevent loss of liquid crystal material from the interior volume 88, as is described above. The liquid crystal cell may be from about 0.01 millimeter to about 2 millimeters, more preferably 0.1 to 0.8 millimeter, and still more preferably 0.1 to 0.5 millimeter in thickness, i.e., the dimension between the glass plates 81, 82. A preferred thickness is about 0.5 millimeter. The various plan dimensions, e.g., the length and width of the cell 80, may vary and are not particularly critical, other than it being desired to maintain a substantially uniform thickness through the cell. Moreover, depending on the desired operation, the type of material used, the nature of the light intended to be limited, and so on, the various dimensions mentioned herein may vary.

Figure 6:
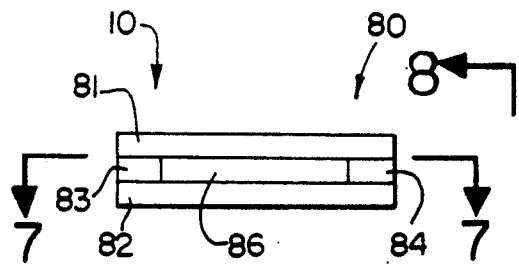
FIG. 6 is an end view of a liquid crystal optical limiter according to an embodiment of the invention.

Although no alignment layer has been shown in FIGS. 6-8 for clarity and simplicity of the illustrations there, preferably such an alignment layer is included in the liquid crystal cell 80, as was described above with respect to FIG. 1. Such an exemplary alignment layer 90 is illustrated in FIG. 9 for use with liquid crystal material having positive dielectric anisotropy. Specifically, such alignment layer 90, which would be included on the inner surface of each of the glass plates 81, 82, has the rub direction extending from one electrode to the other. Therefore, when using liquid crystal material 12, for example, that has positive dielectric anisotropy, upon application of electric field between the electrodes 30, 32, the liquid crystal will align with the field and in the rub direction of the alignment layer 90.

Figure 10:
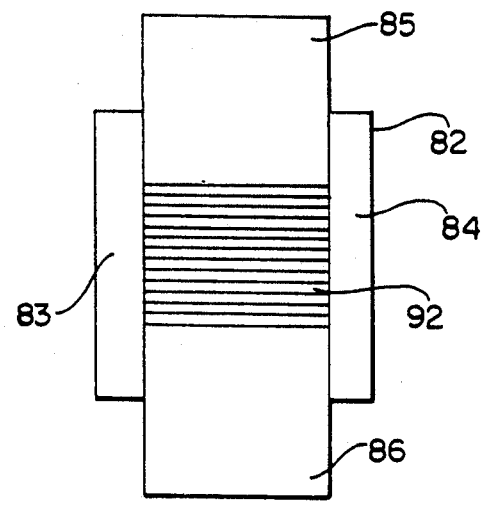
FIG. 10 is a top view of the liquid crystal optical limiter similar to FIGS. 7 and 9 but showing a liquid crystal aligning material and a rubbing direction that is generally perpendicular with respect to the direction that an electric field would be applied.

An exemplary alignment layer 92 is illustrated in FIG. 10 for use with liquid crystal material having negative dielectric anisotropy. Specifically, such alignment layer 92, which would be included on the inner surface of each of the glass plates 81, 82, has the rub direction perpendicularly to a line drawn from one electrode to the other. Therefore, when using liquid crystal material 12, for example, that has negative dielectric anisotropy, upon application of electric field between the electrodes 30, 32, the liquid crystal will align perpendicularly with respect to the field and in the rub direction of the alignment layer 92.

Figure 11:
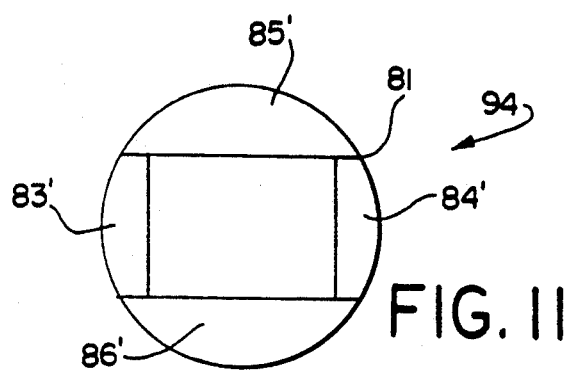
FIG. 11 is a top view of a modified liquid crystal optical limiter similar to illustration of FIG. 7.

In FIG. 11 is illustrated a top plan of a modified liquid crystal cell optical limiter 94. The optical limiter 94 is similar to the optical limiter 80 described above, except that the shape is circular rather than rectangular, as is evident from the drawing. Parts similar to those illustrated in FIGS. 6-8 are designated by the same reference numerals with a prime added thereto. Therefore, the limiter 94 includes glass plates 81', for example, glass spacers 83', for example, electrodes 85', 86', and liquid crystal material in the interior volume, and so on.

Figure 12:
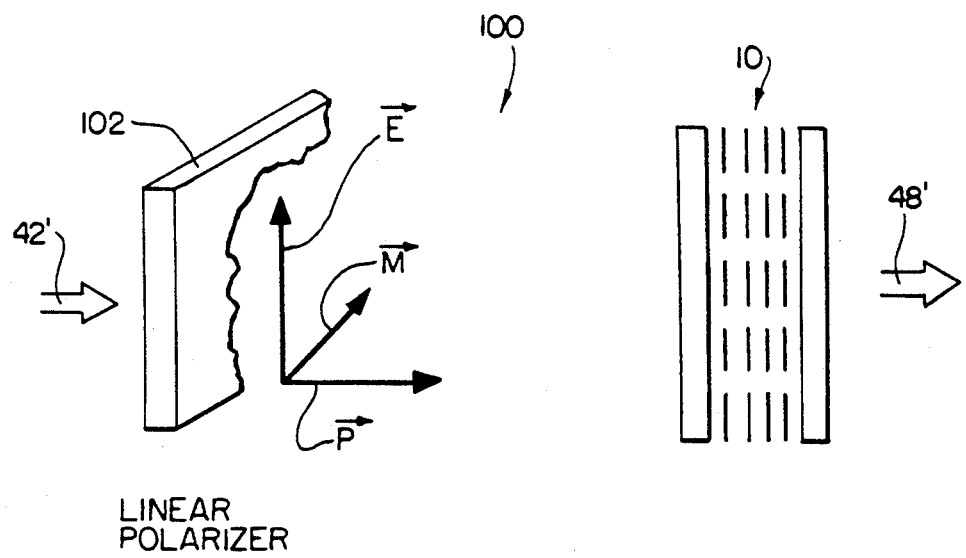
FIG. 12 is a schematic illustration showing the preferred maximum optical limiting operation of liquid crystal optical limiter according to the invention using incident light that is polarized such that the direction of the electric vector is parallel to the long axis or extraordinary axis of the liquid crystal material.

Turning to FIG. 12, a preferred embodiment of optical limiter system is illustrated at 100. In the system 100 a linear polarizer 102 polarizes the incident light 42 so that the electric vector E and magnetic vector B are at right angles to the direction of propagation P, and so that the direction of electric vector E is parallel to the long axis or extraordinary axis of the liquid crystal molecules 12 in the liquid crystal optical limiter 10. It has been found that the amount of attenuation or limiting of power of output light in response to the power of the input light is a function of the direction of such electric vector E. In fact, it has been found that maximum power limiting is achieved when the electric vector E is parallel to the long axis or extraordinary axis of the liquid crystal molecules, and a lesser amount of limiting occurs when the electric vector is at some angle other than parallel to such axis.

In FIG. 13 is illustrated a graph showing the amount of power limiting for optical limiter 10 as a function of the direction of the electric vector E for incident (input) light 42 relative to the direction of the long axis of the liquid crystal molecules 12. On the abscissa are microjoules power for the input light 42, 42'; and the ordinate are microjoules of the output light 48, 48'. The various data points in the graph of FIG. 13, e.g., "x", "", "*", and a "square" represent angles of electric vector parallel to the long axis of the liquid crystal molecules; at right angles; at 45 degrees and at 67 degrees to such long axis, respectively.

Figure 14:
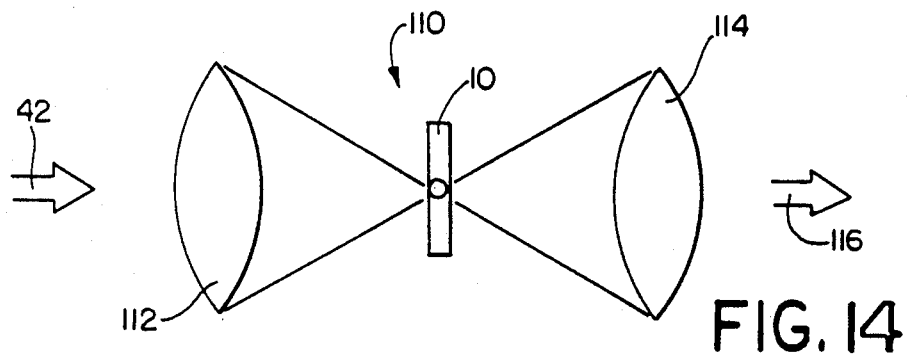
FIG. 14 is a schematic illustration of an optical device, such as a gun sight, binocular, telescope, goggles, etc., employing a liquid crystal optical limiter according to the present invention.

An optical system 110 according to the invention is illustrated in FIG. 14. In the system 110 there are one or more input lenses and/or other optical elements 112 which provide light to the optical limiter 42. There also are further lenses and/or other optical elements 114, which receive light from the optical limiter and provide output light 116 from the system. The elements 112, 114 may be, for example, parts of a telescope, camera lens system, gun sight, goggles, binoculars, etc. The optical limiter as part of the system 110 limits the power of the output light 116 in the manner described above, for example, to avoid damage to that which is at the downstream side of the optical element 114 receiving the output light 116.

Figure 15:
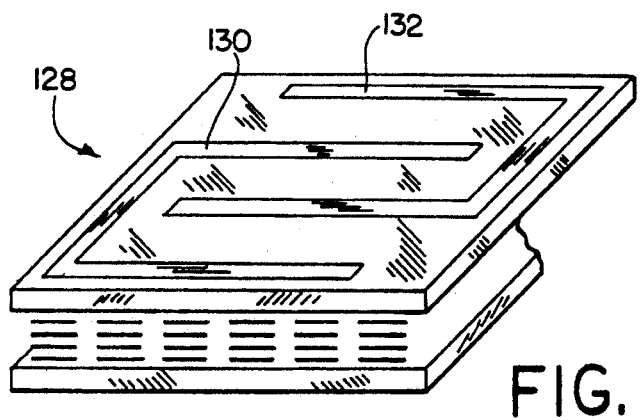
FIG. 15 is a schematic fragmentary perspective illustration of a modified liquid crystal optical limiter according to the invention using interdigitated electrodes for applying electric field to the liquid crystal material.

As is seen in FIG. 15, a modified optical limiter 128 with an arrangement of interdigitated electrodes 130, 132 is shown. Such electrode arrangement may be used in place of or in addition to the electrodes 30, 32 of FIG. 1, for example. Application of a voltage across the interdigitated electrodes 130, 132 tends to apply electric field in parallel to the surface 18 to achieve the desired liquid crystal alignment mentioned above. A similar arrangement of interdigitated electrodes also may be used on the lower plate relative to the illustration of FIG. 15; but preferably only one of the electrode sets, i.e., that set on the top plate or that on the bottom should be energized at one time so that the electric field is applied parallel to the surfaces and not between the surfaces.

INDUSTRIAL APPLICATION

In view of the foregoing it will be appreciated that the optical limiter of the invention may be used to limit the power of light output thereby, e.g., to protect a downstream device from damage due to excess power, etc.

We claim:

1. An optical limiter, comprising a pair of bounding surfaces, and smectic liquid crystal means between said bounding surfaces operative as a function of the energy of incident electromagnetic energy directed generally along a path from one bounding surface into said liquid crystal means toward the other bounding surface and exceeding a threshold to tend to self-focus such electromagnetic energy, said liquid crystal means being aligned in layers which are oriented generally perpendicularly with respect to said bounding surfaces.

2. The limiter of claim 1, said liquid crystal means comprising smectic A liquid crystal.

3. The limiter of claim 1, said liquid crystal means consisting essentially of smectic A liquid crystal.

4. The limiter of claim 1, wherein a plurality of said layers are aligned in parallel with each other.

5. The limiter of claim 1, wherein the liquid crystal means in a layer is aligned generally perpendicularly with respect to the direction of the layer in which it is located.

6. The limiter of claim 1, wherein the liquid crystal means is aligned generally in parallel with said surfaces.

7. The limiter of claim 1, wherein at least one of said surfaces is planar.

8. The limiter of claim 7, wherein two of said surfaces are planar.

9. The limiter of claim 8, wherein said two of said surfaces are generally parallel with each other.

10. The limiter of claim 1, further comprising aligning means for aligning said liquid crystal means generally in parallel with said pair of bounding surfaces.

11. The limiter of claim 1, wherein said liquid crystal means is oriented between said surfaces in a bookshelf alignment.

12. The limiter of claim 1, said liquid crystal means being responsive to incident coherent light that has a wave length in at least one of the infrared, visible and ultraviolet wave length ranges.

13. The limiter of claim 1, said liquid crystal means being responsive to the electric vector of such incident electromagnetic energy to effect such self-focusing when such electric vector exceeds a prescribed value.

14. The limiter of claim 13, wherein said liquid crystal means is operative to respond to least one of a prescribed energy and peak power of such incident electromagnetic energy.

15. The limiter of claim 13, wherein said liquid crystal means effects self-focusing of such electromagnetic energy to an extent that is a function of a characteristic of such incident electromagnetic energy.

16. The limiter of claim 15, said liquid crystal means being responsive to the electric vector of such incident electromagnetic energy to effect such self-focusing when such electric vector exceeds a prescribed value.

17. The limiter of claim 15, wherein said liquid crystal means is operative to respond to least one of a prescribed energy or peak power of such incident electromagnetic energy.

18. The limiter of claim 1, wherein in response to incident electromagnetic energy having a characteristic below a prescribed value the limiter is substantially transmissive, and wherein in response to an increase in the value of such characteristic the limiter automatically reduces the transmissive characteristic thereof.

19. The limiter of claim 18, wherein such reduction in transmissive characteristic is caused by increasing reflection of such electromagnetic energy.

20. The limiter of claim 19, wherein such reflection includes a substantial amount of total internal reflection.

21. The limiter of claim 19, wherein such electromagnetic energy is light said liquid crystal means being responsive to incident coherent light that has a wave length in at least one of the infrared, visible and ultraviolet wave length ranges.

22. The limiter of claim 18, wherein said smectic liquid crystal means automatically resumes such substantially transmissive characteristic upon removal of such electromagnetic energy as long as the optical limiting characteristic of the limiter has not exceeded a prescribed amount.

23. The limiter of claim 22, wherein such prescribed amount is a ratio on the order of about twenty to one.

24. The limiter of claim 23, said liquid crystal means being operative to effect such self-focusing to an extent as to cause scattering of liquid at least at one of said surfaces when a characteristic of the incident light exceeds a prescribed value.

25. The limiter of claim 24, wherein such scattering is caused by reflection of light at said one of said surfaces.

26. The limiter of claim 25, wherein such reflection comprises total internal reflection.

27. The limiter of claim 1, wherein said liquid crystal means is operative to reduce the time required to effect limiting of transmission of electromagnetic energy therethrough as the energy of the incident electromagnetic energy increases.

28. The limiter of claim 1, wherein the amount of limiting of transmission of electromagnetic energy through the limiter increases non-linearly as a function of an increase in the energy of the incident electromagnetic energy.

29. The limiter of claim 28, wherein the liquid crystal means is responsive to incident coherent light.

30. The limiter of claim 29, wherein such incident coherent light is in the form of a pulse, and wherein when the pulse exceeds a prescribed value, beyond such value the larger the input pulse the lower the value of the value of the light output from the limiter.

31. The limiter of claim 1, wherein said liquid crystal means has positive dielectric anisotropy.

32. The limiter of claim 1, wherein said liquid crystal means has negative dielectric anisotropy.

33. The limiter of claim 1, further comprising means for applying electric field to the liquid crystal means to tend to align the liquid crystal structure with respect to such field.

34. The limiter of claim 33, further comprising aligning means for aligning said liquid crystal means generally in parallel with said pair of bounding surfaces.

35. The limiter of claim 34, said means for applying electric field comprises means for applying electric field generally in parallel with said surfaces, wherein said liquid crystal means has positive dielectric anisotropy, and said means for aligning comprising means for aligning such liquid crystal generally in the direction of an applied electric field.

36. The limiter of claim 34, said means for applying electric field comprises means for applying electric field generally in parallel with said surfaces, wherein said liquid crystal means has negative dielectric anisotropy, and said means for aligning comprising means for aligning such liquid crystal means generally perpendicularly with respect to the direction of an applied electric field.

37. The limiter of claim 1, said liquid crystal means being responsive to incident light, said liquid crystal means having ordinary and extraordinary indices of refraction and ordinary and extraordinary axes, and wherein operation to limit transmission of light output from the limiter is greater when the incident light is linearly polarized such that the electric vector of the incident light is parallel to such extraordinary axis of the liquid crystal means.

38. Optical limiter, comprising a pair of bounding surfaces, smectic liquid crystal means between said bounding surfaces operative as a function of the energy of incident electromagnetic energy exceeding a threshold to tend to self-focus such electromagnetic energy, said liquid crystal means being aligned in layers which are oriented generally perpendicularly with respect to said surfaces, and aligning means for aligning said liquid crystal means generally in parallel with said pair of bounding surfaces, said aligning means comprising means for aligning the liquid crystal means at each surface in parallel with the other liquid crystal means at such respective surface, and for aligning the liquid crystal means at one surface in parallel with the liquid crystal means at the other surface.

39. Optical limiter, comprising a pair of bounding surfaces, and smectic liquid crystal means between said bounding surfaces operative as a function of the energy of incident electromagnetic energy exceeding a threshold to tent to self-focus such electromagnetic energy, said liquid crystal means being aligned in layers which are oriented generally perpendicularly with respect to said surfaces, wherein the distance between said surfaces is from about 0.01 millimeter to about 2 millimeters.

40. The limiter of claim 39, wherein the distance between said surface is from about 0.1 to 0.8 millimeter.

41. The limiter of claim 40, wherein the distance between said surfaces is from about 0.1 to 0.5 millimeter.

42. An optical apparatus comprising means for receiving incident light, means for delivering output light as an output of the apparatus, optical means for directing incident light to said means for delivering output light to provide a light output from the apparatus, and an optical limiter between said means for receiving and said means for delivering operative automatically to limit the amount of output light as a function of the value of a characteristic of such incident light, said optical limiter comprising smectic liquid crystal between a pair of bounding surfaces, said liquid crystal being aligned in layers which are oriented generally perpendicularly with respect to said surfaces.

43. Optical limiter, comprising a pair of bounding surfaces, and smectic liquid crystal means between said bounding surfaces operative as a function of the energy of incident electromagnetic energy exceeding a threshold to tend to change index of refraction characteristic, said liquid crystal means being aligned in layers which are oriented generally perpendicularly with respect to said surfaces.

44. Optical limiter, comprising a pair of bounding surfaces, and smectic liquid crystal means between said bounding surfaces operative as a function of the energy of incident coherent light energy exceeding a threshold to tend to self-focus such light by changing index of refraction different amounts across the wavefront of the light transmitted therethrough, said liquid crystal means being aligned in layers which are oriented generally perpendicularly with respect to said surfaces.

45. An optical apparatus, comprising smectic liquid crystal means in layered alignment for automatically limiting the transmission of light therethrough as a function of the energy of such light when such energy exceeds a threshold energy, and surfaces between which said liquid crystal means is located, and alignment means for affecting alignment of said liquid crystal means to tend to maintain said liquid crystal means in layered alignment between said surfaces generally in parallel with said surfaces in layers that extend generally perpendicularly to said surface.

46. A method of limiting the transmission of electromagnetic energy through a liquid crystal material, comprising directing such electromagnetic energy to a smectic liquid crystal material that is arranged in a layered alignment, and permitting such liquid crystal material to effect self-focusing of such electromagnetic energy when the energy of such electromagnetic energy exceeds a threshold value.

47. A method of limiting the energy of electromagnetic energy comprising directing such electromagnetic energy to a smectic liquid crystal material, arranging such liquid crystal material in a layered alignment, and using such liquid crystal material when the energy of such electromagnetic energy exceeds a threshold energy to effect self-focusing by the liquid crystal material of such electromagnetic energy to reduce the energy density of such electromagnetic energy transmitted through such liquid crystal material.

48. The method of claim 47, further comprising effecting total internal reflection of at least some of such electromagnetic energy that is self-focused to reduce the energy density of electromagnetic energy that is transmitted through such liquid crystal material.

49. The limiter of claim 1, wherein said smectic liquid crystal means comprises, by weight from about 13.9% to about 19.2% K-24, from abut 26.6% to about 38.4% K-30, from about 29.5% to about 42.4% K-36 and from about 0% to about 30.0% 2LI-1844; where K-24 is 4-Cyano-4'-n-octylbiphenyl represented

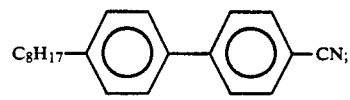

K-30 is

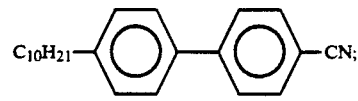

K-36 is 4-Cyano-4'-n-Dodecanylbiphenyl represented

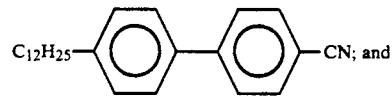

2LI-1844 is nematic liquid crystal.

50. Optical limiter, comprising a pair of bounding surfaces, smectic liquid crystal means between said bounding surfaces operative as a function of the energy of incident electromagnetic energy exceeding a threshold to tend to self-focus such electromagnetic energy, said liquid crystal means being aligned in layers which are oriented generally perpendicularly with respect to said surfaces, said liquid crystal means being generally in parallel with said pair of bounding surfaces, said liquid crystal means at each surface being aligned generally in parallel with the other liquid crystal means at such respective surface, and said liquid crystal means at one surface being aligned generally in parallel with the liquid crystal means at the other surface.

* * * * *